US012738296B1

(12) United States Patent
Sudo

(10) Patent No.: US 12,738,296 B1
(45) Date of Patent: Sep. 15, 2026

(54) MAGNETIC DISK DEVICE AND METHOD

(71) Applicants: KABUSHIKI KAISHA TOSHIBA, Kawasaki (JP); TOSHIBA ELECTRONIC DEVICES & STORAGE CORPORATION, Kawasaki (JP)

(72) Inventor: Daisuke Sudo, Kawasaki (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 0 days.

(21) Appl. No.: 19/389,150

(22) Filed: Nov. 14, 2025

(30) Foreign Application Priority Data

Aug. 7, 2025 (JP) ................................ 2025-132047

(51) Int. Cl.
*G11B 5/55* (2006.01)

(52) U.S. Cl.
CPC ................................ *G11B 5/5547* (2013.01)

(58) Field of Classification Search
CPC ... G11B 5/5547; G11B 5/5552; G11B 5/5573; G11B 5/5513; G11B 5/5526
See application file for complete search history.

(56) References Cited

U.S. PATENT DOCUMENTS 5,761,007 A * 6/1998 Price .................... G11B 5/4813
5,995,318 A 11/1999 Hasegawa et al.
7,539,814 B2 5/2009 Pollock et al.
8,755,143 B2 6/2014 Wilson et al.
10,475,475 B2 * 11/2019 Hasegawa ............ G11B 5/4846
10,930,310 B1 * 2/2021 Uchida ................. G06F 3/0676
2013/0258520 A1 * 10/2013 Matsuzawa .......... G11B 5/5552 360/75
2023/0142495 A1 * 5/2023 Hara .................... G11B 19/042
2023/0229343 A1 * 7/2023 Edgar ..................... G06F 3/061 711/154
2024/0428829 A1 * 12/2024 Takeuchi ............. G11B 5/5547

FOREIGN PATENT DOCUMENTS

JP 2008217979 A 9/2008

* cited by examiner

*Primary Examiner* — Andrew Sasinowski
(74) *Attorney, Agent, or Firm* — Maier & Maier, PLLC

(57) ABSTRACT

According to one embodiment, a controller executes a first command for accessing a first recording surface, executes a seek operation subsequent to completion of the access according to the first command, and executes a second command for accessing a second recording surface subsequent to completion of the seek operation. The seek operation includes performing a waiting operation in accordance with a relative velocity in a radial direction between a first magnetic head and a second magnetic head after completion of the access according to the first command. The first magnetic head faces the first recording surface, and the second magnetic head faces the second recording surface. The seek operation includes executing, subsequent to the waiting operation, switching of a magnetic head in use from the first magnetic head to the second magnetic head and starting of movement of a group of the magnetic heads.

20 Claims, 12 Drawing Sheets

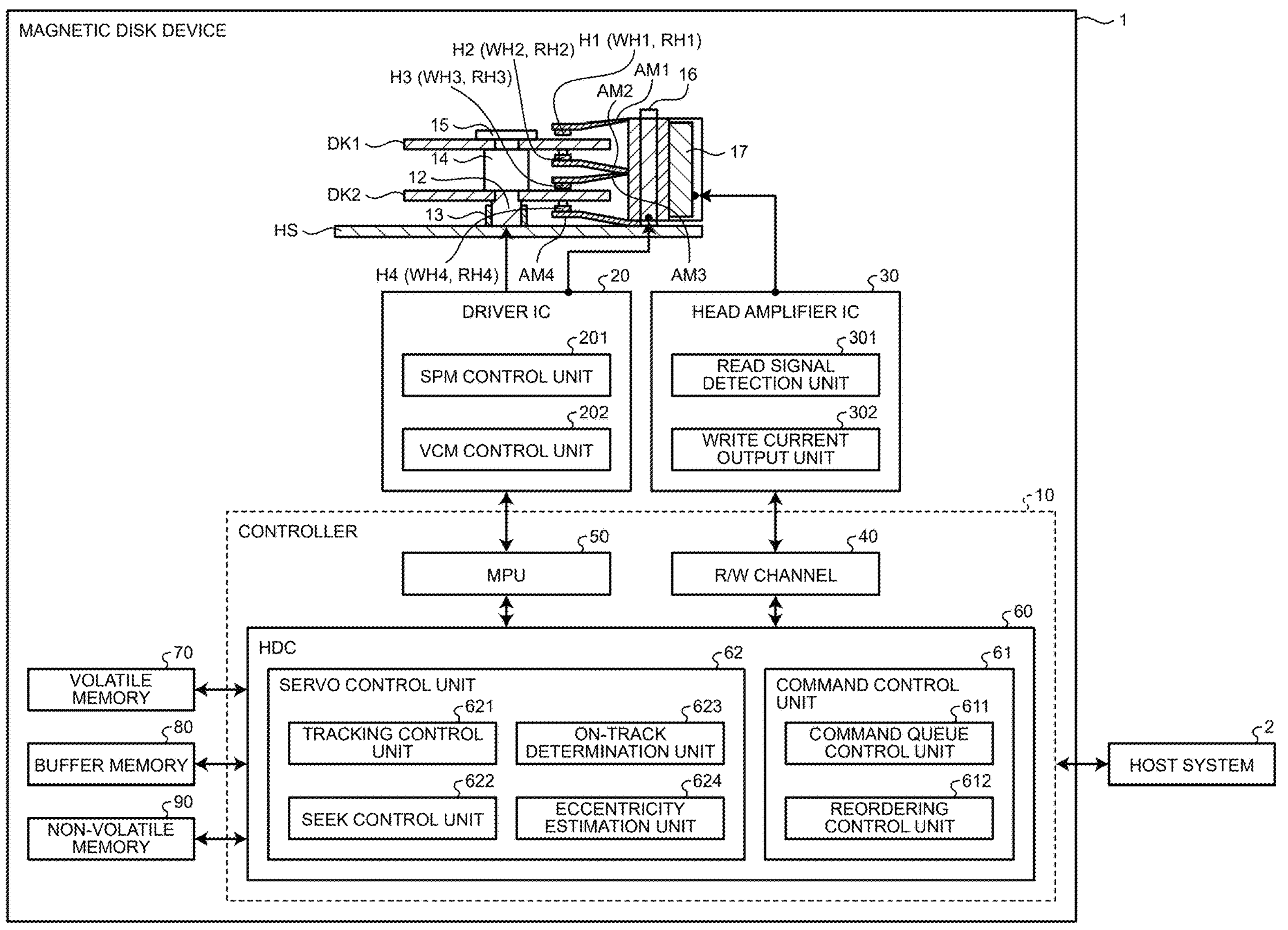

FIG.1
MAGNETIC DISK DEVICE
1
H1 (WH1, RH1)
H2 (WH2, RH2)
H3 (WH3, RH3)
H4 (WH4, RH4)
AM1
AM2
AM3
AM4
16
17
15
14
12
13
DK1
DK2
HS
DRIVER IC
20
SPM CONTROL UNIT
201
VCM CONTROL UNIT
202
HEAD AMPLIFIER IC
30
READ SIGNAL DETECTION UNIT
301
WRITE CURRENT OUTPUT UNIT
302
CONTROLLER
10
MPU
50
R/W CHANNEL
40
HDC
60
SERVO CONTROL UNIT
62
TRACKING CONTROL UNIT
621
ON-TRACK DETERMINATION UNIT
623
SEEK CONTROL UNIT
622
ECCENTRICITY ESTIMATION UNIT
624
COMMAND CONTROL UNIT
61
COMMAND QUEUE CONTROL UNIT
611
REORDERING CONTROL UNIT
612
VOLATILE MEMORY
70
BUFFER MEMORY
80
NON-VOLATILE MEMORY
90
HOST SYSTEM
2

| SEEK DISTANCE | SEEK-ON-TRACK TIME ESTIMATION VALUE |
| --- | --- |
| $D_{sk1}$ | $T_{skontrk\_esti0\_1}$ |
| $D_{sk2}$ | $T_{skontrk\_esti0\_2}$ |
| . | . |
| $D_{sk\_m}$ | $T_{skontrk\_esti0\_3}$ |

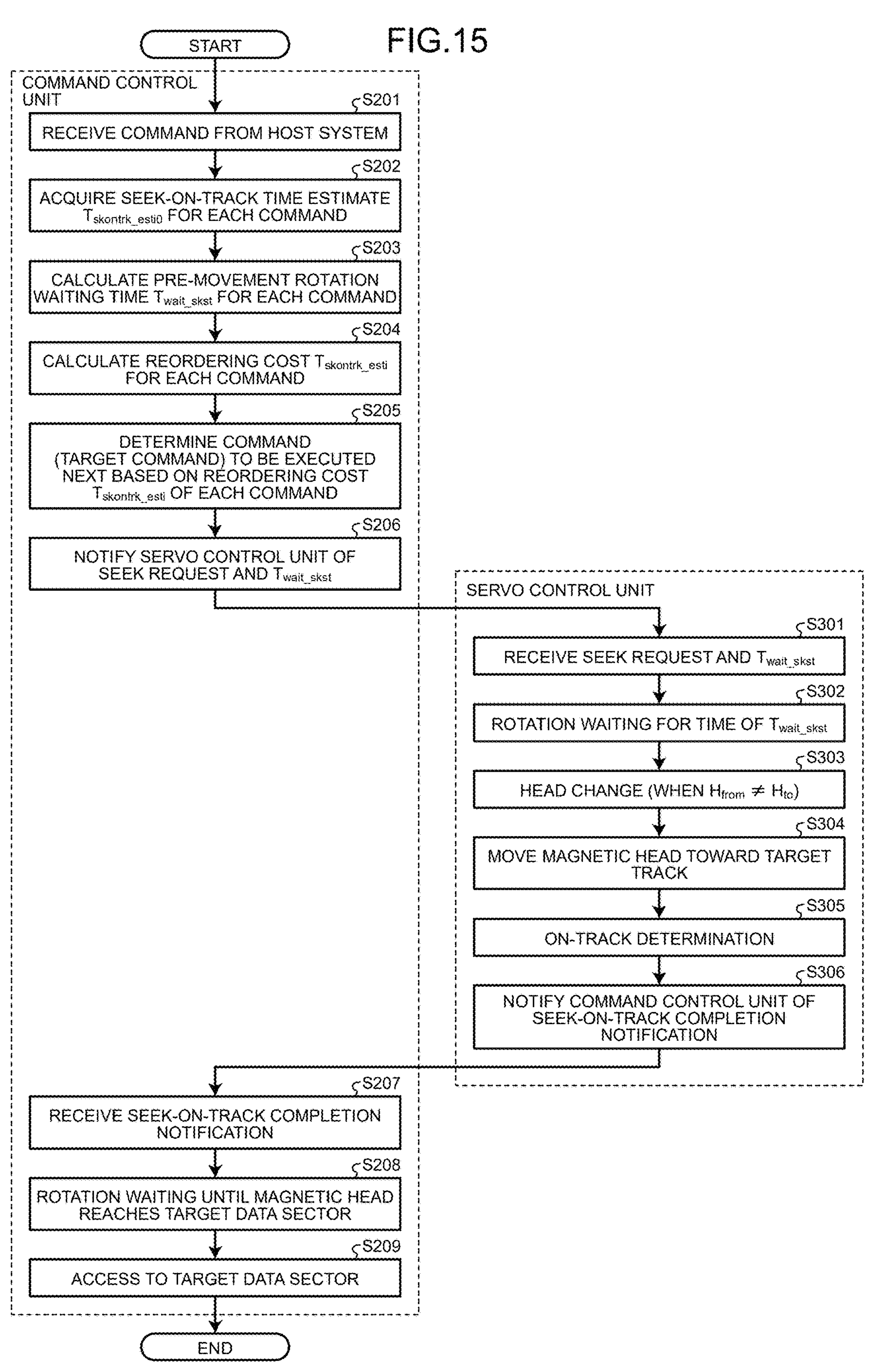
FIG.15
START
COMMAND CONTROL UNIT
S201
RECEIVE COMMAND FROM HOST SYSTEM
S202
ACQUIRE SEEK-ON-TRACK TIME ESTIMATE $T_{skontrk\_esti0}$ FOR EACH COMMAND
S203
CALCULATE PRE-MOVEMENT ROTATION WAITING TIME $T_{wait\_skst}$ FOR EACH COMMAND
S204
CALCULATE REORDERING COST $T_{skontrk\_esti}$ FOR EACH COMMAND
S205
DETERMINE COMMAND (TARGET COMMAND) TO BE EXECUTED NEXT BASED ON REORDERING COST $T_{skontrk\_esti}$ OF EACH COMMAND
S206
NOTIFY SERVO CONTROL UNIT OF SEEK REQUEST AND $T_{wait\_skst}$
SERVO CONTROL UNIT
S301
RECEIVE SEEK REQUEST AND $T_{wait\_skst}$
S302
ROTATION WAITING FOR TIME OF $T_{wait\_skst}$
S303
HEAD CHANGE (WHEN $H_{from} \neq H_{to}$)
S304
MOVE MAGNETIC HEAD TOWARD TARGET TRACK
S305
ON-TRACK DETERMINATION
S306
NOTIFY COMMAND CONTROL UNIT OF SEEK-ON-TRACK COMPLETION NOTIFICATION
S207
RECEIVE SEEK-ON-TRACK COMPLETION NOTIFICATION
S208
ROTATION WAITING UNTIL MAGNETIC HEAD REACHES TARGET DATA SECTOR
S209
ACCESS TO TARGET DATA SECTOR
END

FIG.17

MAGNETIC DISK DEVICE AND METHOD

CROSS-REFERENCE TO RELATED APPLICATIONS

This application is based upon and claims the benefit of priority from Japanese Patent Application No. 2025-132047, filed on Aug. 7, 2025; the entire contents of which are incorporated herein by reference.

FIELD

Embodiments described herein relate generally to a magnetic disk device and a method.

BACKGROUND

A magnetic disk device in recent years includes a plurality of magnetic disks. A spacer is provided between two adjacent magnetic disks among the magnetic disks. The magnetic disks are integrally fixed by a clamper.

After the magnetic disk device is manufactured, one or more magnetic disks may shift when the temperature changes due to a difference in thermal expansion coefficient of each member (that is, for example, the magnetic disk, the spacer, or the clamper) constituting the integrally fixed magnetic disks. In addition, one or more magnetic disks may shift when an impact is applied. Such shifting of one or more magnetic disks after manufacture is referred to as a subsequent disk shift.

BRIEF DESCRIPTION OF THE DRAWINGS

FIG. 1 is a diagram illustrating an example of a configuration of a magnetic disk device according to an embodiment;

FIG. 4 is a view illustrating an example of a configuration of a seek-on-track time table 72 according to the embodiment;

FIG. 15 is a flowchart illustrating an example of an operation of executing a command according to the embodiment;

FIG. 17 is a view illustrating an example of a relationship between a threshold and a seek distance according to a modification.

DETAILED DESCRIPTION

Figure 2:
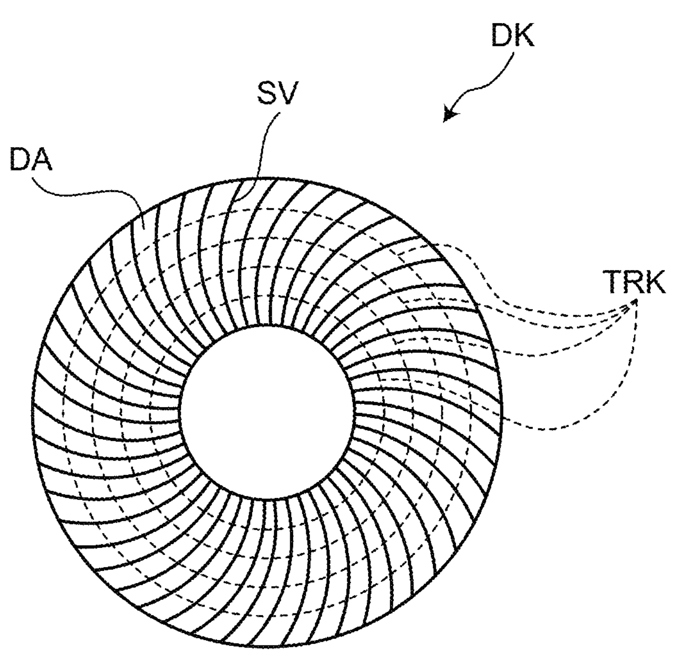
FIG. 2 is a view illustrating an example of a configuration of a magnetic disk according to the embodiment.

According to the present embodiment, a magnetic disk device includes two or more magnetic disks, a first motor, a group of magnetic heads, a second motor, and a controller. The two or more magnetic disks include two or more recording surfaces. The first motor is configured to integrally rotate the two or more magnetic disks. The group of magnetic heads faces mutually different recording surfaces among the two or more recording surfaces. The second motor is configured to integrally move the group of magnetic heads in a radial direction of the two or more magnetic disks. The controller is configured to execute a first command. The first command is a command for accessing a first recording surface among the two or more recording surfaces. The controller is configured to execute a seek operation for executing a second command subsequent to completion of access according to the first command. The second command is a command for accessing a second recording surface different from the first recording surface among the two or more recording surfaces. The controller is configured to execute the second command subsequent to completion of the seek operation. The seek operation includes performing a waiting operation in accordance with a relative velocity in the radial direction between a first magnetic head and a second magnetic head after the completion of the access according to the first command. The first magnetic head is a magnetic head facing the first recording surface in the group of magnetic heads. The second magnetic head is a magnetic head facing the second recording surface in the group of magnetic heads. The seek operation includes executing, subsequent to the waiting operation, switching of a magnetic head in use from the first magnetic head to the second magnetic head and starting of movement of the group of magnetic heads using the second motor.

Hereinafter, the magnetic disk device and a method according to embodiments will be described in detail with reference to the drawings. Note that the present disclosure is not limited to the described embodiments.

Embodiment

FIG. 1 is a diagram illustrating an example of a configuration of a magnetic disk device 1 according to an embodiment.

The magnetic disk device 1 is connected to a host system 2. The magnetic disk device 1 can receive an access command such as a write command or a read command from the host system 2. The access command includes a logical address indicating a location of an access destination.

The magnetic disk device 1 includes a plurality of magnetic disks DK. In the example illustrated in FIG. 1, the magnetic disks DK are two magnetic disks DK: a magnetic disk DK1 and a magnetic disk DK2. Note that the number of magnetic disks DK included in the magnetic disk device 1 may be three or more.

A spacer 14 is provided between the magnetic disk DK1 and the magnetic disk DK2. The magnetic disk DK1 and the magnetic disk DK2 are integrally fixed by a clamper 15.

The magnetic disk DK1 and the magnetic disk DK2 are integrally rotated by a spindle motor (SPM) 13 about a shaft 12 provided in a housing HS.

Recording surfaces on which data can be recorded are formed on front surfaces and back surfaces of the two magnetic disks DK. Thus, the two magnetic disks DK have four recording surfaces. In order to access each of the four recording surfaces, the magnetic disk device 1 includes four magnetic heads H corresponding to the four recording surfaces. The four magnetic heads H are magnetic heads H1, H2, H3, and H4.

Note that, as one example, a side opposite to the SPM 13 is referred to as a front surface. A side of the SPM 13 is referred to as a back surface. Note that the definitions of the front surface and the back surface are not limited thereto.

The magnetic head H1 is provided to face the front surface of the magnetic disk DK1. The magnetic head H2 is provided to face the back surface of the magnetic disk DK1. The magnetic head H3 is provided to face the front surface of the magnetic disk DK2. The magnetic head H4 is provided to face the back surface of the magnetic disk DK2.

The magnetic heads H execute access, that is, writing of data and reading of data with respect to the recording surfaces facing themselves of the two magnetic disks DK, respectively. Each of the magnetic heads H includes a write head WH serving to write data to the recording surface and a read head RH serving to read data from the recording surface. Specifically, the magnetic head H1 includes a write head WH1 and a read head RH1. The magnetic head H2 includes a write head WH2 and a read head RH2. The magnetic head H3 includes a write head WH3 and a read head RH3. The magnetic head H4 includes a write head WH4 and a read head RH4.

The magnetic heads H are attached to distal ends of actuator arms AM, respectively. Specifically, the magnetic head H1 is attached to a distal end of the actuator arm AM1. The magnetic head H2 is attached to a distal end of the actuator arm AM2. The magnetic head H3 is attached to a distal end of the actuator arm AM3. The magnetic head H4 is attached to a distal end of the actuator arm AM4. Note that each of the actuator arms AM may include a micro-actuator that is capable of performing a slight movement. Each of the magnetic heads H may be attached to the corresponding actuator arm AM via a suspension.

The housing HS is provided with a shaft 16 at a position separated from the shaft 12. A voice coil motor (VCM) 17 is provided on the shaft 16. The VCM 17 integrally rotates the actuator arms AM1 to AM4 about the shaft 16 within a predetermined range. Therefore, the VCM 17 can integrally move the magnetic heads H1 to H4 relative to the recording surfaces of the magnetic disks DK1 and DK2 in the radial direction.

The magnetic disk device 1 further includes a controller 10, a driver integrated circuit (IC) 20, a head amplifier IC 30, a volatile memory 70, a buffer memory 80, and a non-volatile memory 90. The controller 10 includes a read write (R/W) channel 40, a micro processing unit (MPU) 50, and a hard disk controller (HDC) 60.

Note that the controller 10 is configured as a system-on-a-chip (SoC). The controller 10 may include other elements (for example, the volatile memory 70, the buffer memory 80, the non-volatile memory 90, and the like) in addition to the R/W channel 40, the MPU 50, and the HDC 60. Note that the controller 10 may be configured by using a plurality of chips.

The driver IC 20 controls each movable unit included in the magnetic disk device 1 under the control of the controller 10. The driver IC 20 includes an SPM control unit 201 and a VCM control unit 202.

The SPM control unit 201 supplies current to the SPM 13 to rotate the SPM 13 at a predetermined rotation speed.

The VCM control unit 202 supplies current to the VCM 17, thereby moving the magnetic heads H1 to H4 in the radial direction with respect to the magnetic disks DK1 and DK2.

The head amplifier IC 30 includes a read signal detection unit 301 and a write current output unit 302. The write current output unit 302 causes a write signal (current), which corresponds to write data input from the R/W channel 40, to flow to the write head WH. The read signal detection unit 301 amplifies a read signal output from the read head RH and supplies the amplified read signal to the R/W channel 40.

The R/W channel 40 is a signal processing circuit. The R/W channel 40 encodes write data input from the HDC 60 and outputs the encoded data to the head amplifier IC 30. In addition, the R/W channel 40 decodes read data from the read signal transmitted from the head amplifier IC 30 and outputs the decoded read data to the HDC 60.

The MPU 50 performs overall control of the magnetic disk device 1 in accordance with firmware stored in the non-volatile memory 90 or the magnetic disk DK.

The HDC 60 controls transmission and reception of data with the host system 2 via an I/F bus. The HDC 60 includes a host interface (host I/F) circuit (not illustrated). The HDC 60 receives a command from the host system 2 and performs command processing. Then, the HDC 60 performs servo control including seek control and tracking control in accordance with a result of the command processing.

The HDC 60 includes a command control unit 61 and a servo control unit 62.

The command control unit 61 receives a command from the host system 2 and responds to the host system 2 with respect to the received command.

For example, upon receiving a write command from the host system 2, the command control unit 61 obtains a target data track and a target data sector, which correspond to a logical address included in the write command. The command control unit 61 transmits, to the servo control unit 62, a seek request that includes information indicating the target data track and the target data sector. The command control unit 61 supplies the write data to the magnetic head H via the R/W channel 40 and the head amplifier IC 30. When writing of the write data to the target data sector by the magnetic head H is completed, the command control unit 61 returns a write completion notification to the host system 2.

Upon receiving a read command from the host system 2, the command control unit 61 obtains a target data track and a target data sector, which correspond to a logical address included in the read command. The command control unit 61 transmits, to the servo control unit 62, a seek request that includes information indicating the target data track and the target data sector. When read data is read from the target data sector by the magnetic head H, the command control unit 61 returns the read data to the host system 2.

The command control unit 61 includes a command queue control unit 611 and a reordering control unit 612.

The command queue control unit 611 generates a command queue (a command queue 71 to be described later) in the volatile memory 70 or the buffer memory 80. The command queue control unit 611 enqueues a command received from the host system 2 into the command queue 71. The command queue control unit 611 dequeues a command to be executed, from the command queue 71.

The reordering control unit 612 performs command reordering when one or more commands are stored in the command queue 71. The command reordering is an operation of determining the execution order of the stored commands regardless of the reception order of these commands. Details of the command reordering will be described later.

The servo control unit 62 includes a tracking control unit 621, a seek control unit 622, an on-track determination unit 623, and an eccentricity estimation unit 624.

Upon receiving a seek request from the command control unit 61, the seek control unit 622 controls a seek operation to move the magnetic head H to a target data track in response to the seek request. For example, the seek control unit 622 acquires servo information from the magnetic head H via the head amplifier IC 30 and the R/W channel 40, and obtains a current position of the magnetic head H based on the servo information. The seek control unit 622 determines a target trajectory or the like of the magnetic head H up to the target data track based on the current position of the magnetic head H. The seek control unit 622 determines a current instruction value based on the target trajectory of the magnetic head H and supplies the current instruction value to the VCM control unit 202 via the MPU 50. The VCM control unit 202 supplies current to the VCM 17 in accordance with the current instruction value. As a result, the magnetic head H is moved to the target data track in the radial direction of the magnetic disk DK.

The tracking control unit 621 determines the current instruction value for keeping the magnetic head H on the target data track.

In a case where the data track TRK is eccentric, the eccentricity estimation unit 624 estimates the amount of eccentricity and the eccentric direction. Note that the eccentricity of the data track TRK will be described later.

The volatile memory 70 is used by the controller 10 to temporarily store data and the like. The volatile memory 70 is, for example, a dynamic RAM (DRAM) or a static RAM (SRAM).

The buffer memory 80 includes a write buffer and a read buffer. The write buffer temporarily stores data to be written to the magnetic disk DK by a command (for example, a write command) instructing writing of write data to the magnetic disk DK. The read buffer temporarily stores data read from the magnetic disk DK by a command (for example, a read command) instructing reading of read data from the magnetic disk DK.

The non-volatile memory 90 stores data in a non-volatile manner. The non-volatile memory 90 is, for example, a flash memory. The non-volatile memory 90 may store operation acceleration data, current instruction value data, and a parameter.

FIG. 2 is a view illustrating an example of a configuration of the magnetic disk DK according to the embodiment. Servo information is written on each of the recording surfaces of each of the magnetic disks DK by, for example, a servo writer or self-servo write (SSW).

FIG. 2 illustrates servo areas SV, which are arranged radially, as an example of the arrangement of servo areas in which the servo information is written. In a circumferential direction, a space between two servo areas SV is a data area DA where data can be written. Concentric data tracks TRK are provided in the radial direction of the magnetic disk DK. On the data track TRK, the data area DA is provided with data sectors in each of which data of a predetermined size is written. The predetermined size is a sector size.

The servo information defines a plurality of servo tracks different from the plurality of data tracks TRK. Correspondences between the data tracks TRK and the servo tracks are generated at the time of manufacture or the like and stored in a predetermined non-volatile storage area (for example, the non-volatile memory 90 or the magnetic disk DK). The controller 10 performs positioning control of the magnetic head H (control of the seek operation and control of the tracking operation) based on the servo information read by the read head RH and the correspondences.

The servo information is data used for estimating a current position of the magnetic head H. The servo information includes a preamble, a servo mark, a gray code, an N burst, a Q burst, and a post code.

The preamble is pattern data of a single cycle that periodically changes in the circumferential direction. The preamble is used for adjusting an amplitude, a phase, and a frequency of sampling data when a servo waveform read by the read head RH is taken into the R/W channel 40 as the sampling data based on a servo clock.

The servo mark is pattern data for determining a demodulation timing of the servo information. Based on a servo mark detection timing, the controller 10 determines demodulation timings of various types of servo information read by the read head RH thereafter.

The gray code includes a servo cylinder address for identifying each of the servo tracks provided on the recording surfaces of the magnetic disks DK and a servo sector address for identifying each of the servo areas on the servo track.

The N burst and the Q burst are pieces of pattern data used for detecting the amount of positional deviation, from a track center, of the servo track indicated by the servo cylinder address included in the gray code.

The post code represents a correction amount for correcting RRO (Repeatable RunOut).

Each shape of the servo track and the data track TRK is ideally a perfect circle about the shaft 12. However, the servo track is warped due to vibration or the like, which is received when the servo information is written. Thus, a radial position of the servo track determined based on a combination of the servo cylinder address and the N burst and the Q burst may deviate from a radial position of the track having the ideal perfect circle shape. This positional deviation occurs repeatedly in the same manner with one rotation of the magnetic disk DK (and the SPM 13) as one cycle, and thus is called RRO. The RRO is corrected to the shape of the perfect circle about the shaft 12 by the post code. Since each of the servo tracks is corrected to the shape of the perfect circle about the shaft 12, each of the data tracks TRK is also corrected to the shape of the perfect circle about the shaft 12. Such an operation of correcting each of the data tracks TRK to the shape of the perfect circle about the shaft 12 is referred to as virtual circle correction.

The servo areas SV are arranged at intervals on the circumference. Therefore, the controller 10 estimates a current position of the magnetic head H in a cycle at which the magnetic head H passes over the servo area SV. A cycle that the current position of the magnetic head H is estimated in the cycle at which the magnetic head H passes over the servo area SV is referred to as a servo sampling cycle.

Note that the post code is not necessarily written in the servo area SV. The post code may be stored in the non-volatile memory 90, for example.

Figure 3:
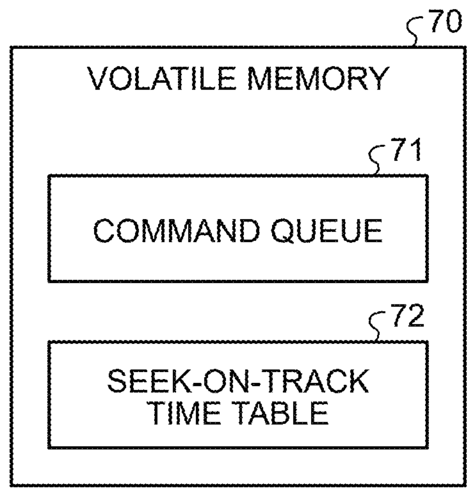
FIG. 3 is a diagram illustrating an example of a configuration of a volatile memory according to the embodiment.

FIG. 3 is a diagram illustrating an example of a configuration of the volatile memory 70 according to the embodiment.

In the volatile memory 70, the command queue 71 is generated by the command control unit 61. Note that the command queue 71 may be generated in the buffer memory 80 as described above.

The volatile memory 70 stores a seek-on-track time table 72 used for a command reordering operation. In the seek-on-track time table 72, a relationship between a seek distance and an estimate of a time required for movement of the magnetic head His recorded. The seek distance is a movement distance of the magnetic head H in the radial direction in the seek operation.

FIG. 4 is a view illustrating an example of a configuration of the seek-on-track time table 72 according to the embodiment. In the example illustrated in the drawing, a seek-on-track time estimate is recorded for each of discrete seek distances.

The seek-on-track time estimate is an approximate estimation value of the time required for the movement of the magnetic head H. More specifically, the seek-on-track time estimate is an estimate of a time until the magnetic head H moves from a starting point to a target data track on one recording surface and then the magnetic head H is brought into an on-track state on the target data track.

The seek-on-track time table 72 is stored in a non-volatile storage area (for example, the non-volatile memory 90) at the time of manufacture. The reordering control unit 612 loads the seek-on-track time table 72 to the volatile memory 70 at the time of activation of the magnetic disk device 1 or the like. Then, the reordering control unit 612 executes command reordering using the seek-on-track time table 72.

Figure 5:
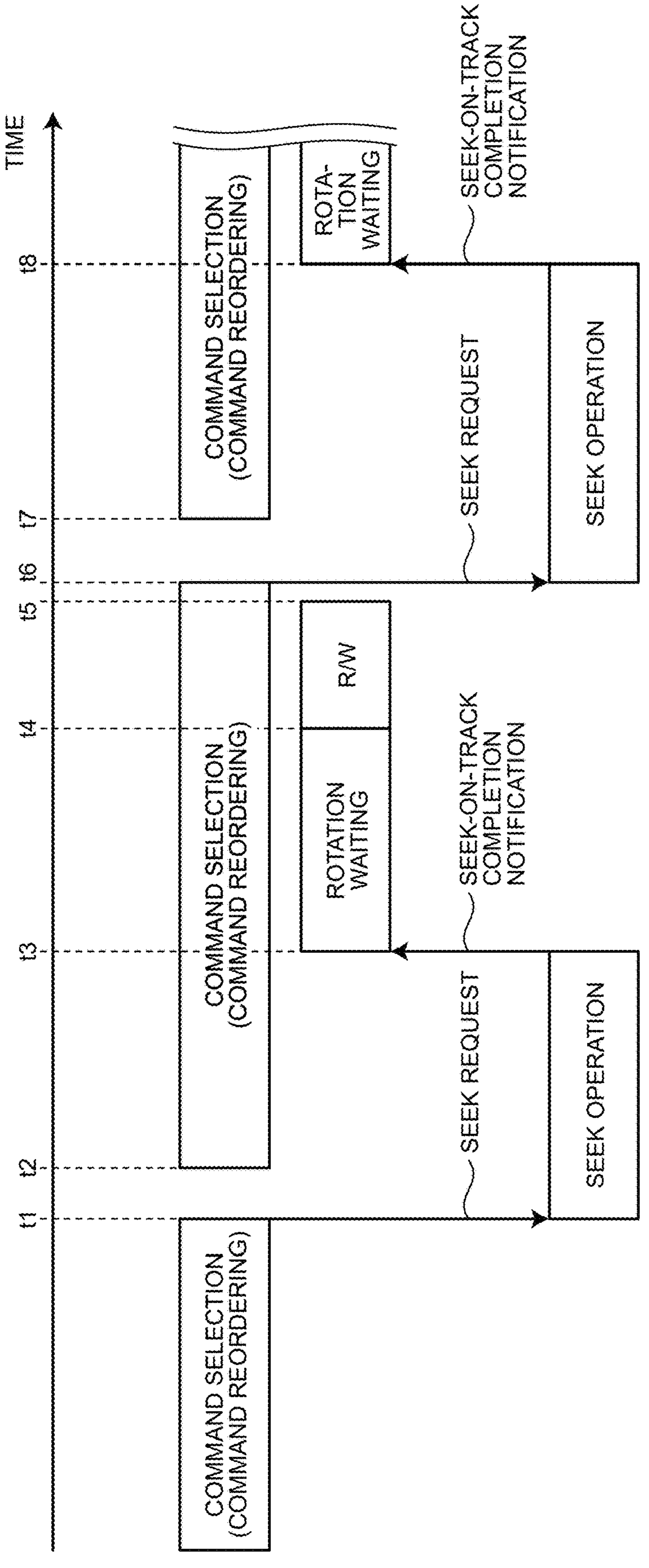
FIG. 5 is a view for describing an example of a timing of a command reordering operation according to the embodiment.

FIG. 5 is a view for describing an example of a timing of the command reordering operation according to the embodiment.

The reordering control unit 612 selects a command from among one or more commands stored in the command queue 71 (more precisely, one or more unexecuted commands stored in the command queue 71) by command reordering.

In the reordering operation, a time required for starting the next access to the magnetic disk DK is regarded as cost. This cost is referred to as a reordering cost. The reordering control unit 612 calculates the reordering cost for each of the one or more commands stored in the command queue 71. Then, the reordering control unit 612 selects a command with the minimum reordering cost.

When the command is selected by the reordering control unit 612, the command control unit 61 transmits a seek request for the selected command to the servo control unit 62 (time t1).

Immediately after transmitting the seek request, the reordering control unit 612 selects one command to be executed next from among one or more commands stored in the command queue 71 by command reordering (time t2).

Meanwhile, in the servo control unit 62, the seek control unit 622 controls the seek operation in response to the seek request received at the time t1. In a case where the magnetic head H is in an on-track state on a target data track by the seek operation, the on-track determination unit 623 determines that the seek operation is completed. Then, the seek control unit 622 transmits a seek-on-track completion notification to the command control unit 61 (time t3).

Upon receiving the seek-on-track completion notification, the command control unit 61 waits for the rotation (hereinafter, rotation waiting) of the magnetic disk DK until the magnetic head H reaches the target data track. As the magnetic head H reaches the target data track, the command control unit 61 controls access, that is, reading or writing with respect to the target data track (times t4 to t5).

The reordering control unit 612 selects one command to be executed next by the command reordering started at the time t2, and transmits a seek request for the one command to be executed next to the servo control unit 62 when the access according to the previously selected command is completed (time t6).

Then, immediately after transmitting the seek request, the reordering control unit 612 selects one command to be further executed next from among one or more commands stored in the command queue 71 by command reordering (time t7).

In the servo control unit 62, the seek control unit 622 controls the seek operation in response to the seek request received at the time t6. In a case where the magnetic head His in an on-track state on the target data track by the seek operation, the seek control unit 622 determines that the seek operation is completed. Then, the seek control unit 622 transmits the seek-on-track completion notification to the command control unit 61 (time t8).

In this manner, the reordering operation is executed while an operation (that is, the seek operation and the access to the magnetic disk DK) according to the previously selected command is performed. Then, when the access to the magnetic disk DK according to the previously selected command is completed, an operation according to the next command selected by reordering is started. As described above, the command with the minimum reordering cost is sequentially selected in the reordering operation. Therefore, in a case where unexecuted commands are stored in the command queue 71, those unexecuted commands can be efficiently executed.

Figure 6:
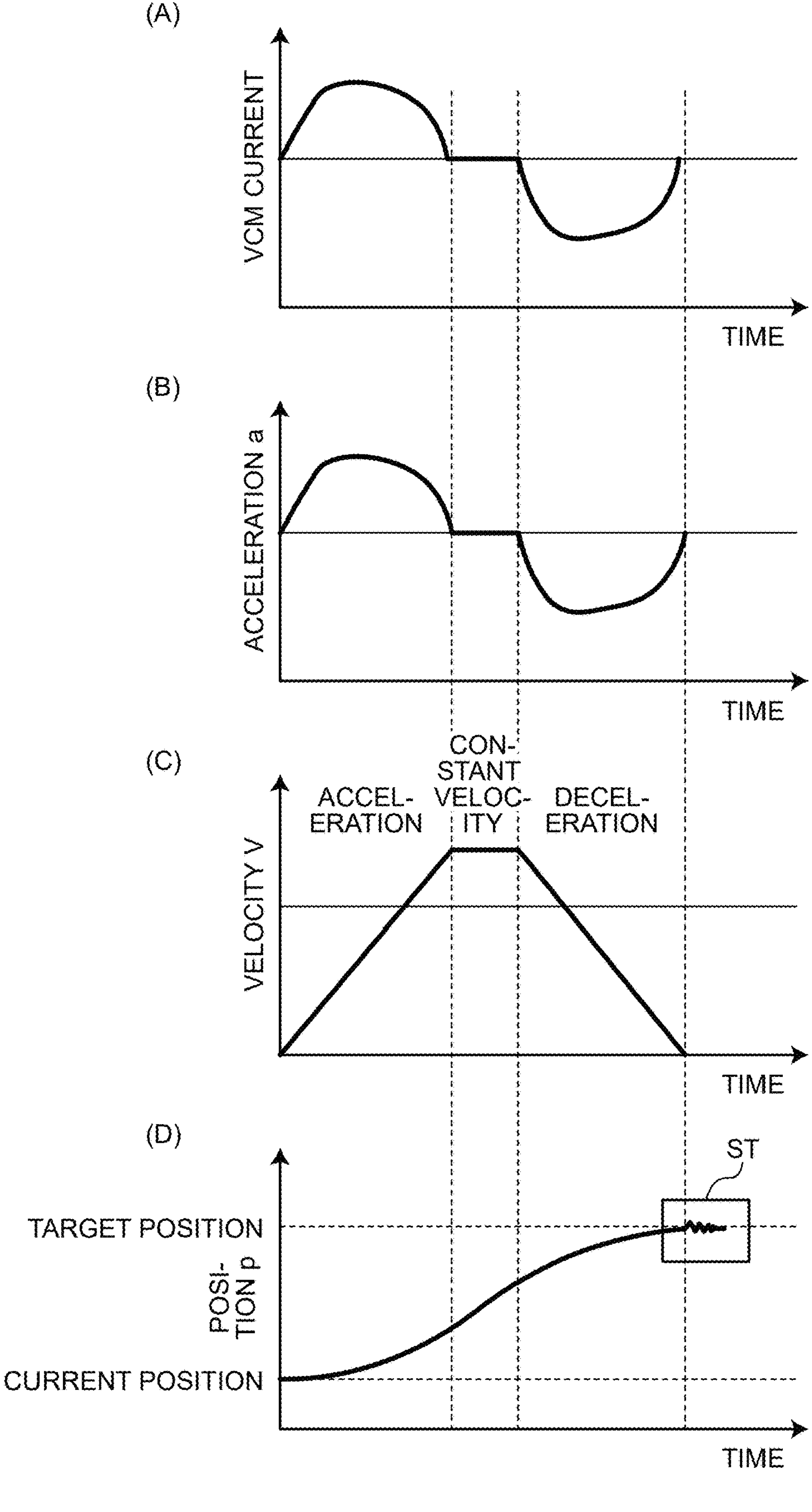
FIG. 6 is a view for describing a seek operation in a certain case according to the embodiment.

FIG. 6 is a view for describing the seek operation in a certain case according to the embodiment. Part (A) is a graph illustrating a waveform of a VCM current I (that is, the amount of current supplied to the VCM 17) during the seek operation. Part (B) is a graph illustrating a waveform of an acceleration a of the magnetic head H during the seek operation. Part (C) is a graph illustrating a waveform of a velocity v of the magnetic head H during the seek operation. Part (D) is a graph illustrating a transition of a radial position of the magnetic head H during the seek operation.

As illustrated in FIG. 6, for moving the magnetic head H from a current position to a target position, the waveform of the velocity v of the magnetic head H and the waveform of the acceleration a of the magnetic head H each have an acceleration section, a constant velocity section, and a deceleration section in this order. Note that the constant velocity section may be omitted in a case where the seek distance is short.

In the acceleration section, current that has a polarity determined depending on whether the target position is on the inner peripheral side or the outer peripheral side with respect to the current position is supplied to the VCM 17 as the VCM current I. In the deceleration section, current that has a polarity opposite to that in the acceleration section is supplied to the VCM 17 as the VCM current I. In the constant velocity section, the VCM current I is substantially zero.

When the magnetic head H is confirmed to be in an on-track state at the target position, that is, on a target data track, the seek operation ends. An operation of determining whether the magnetic head His in the on-track state on the target data track is referred to as a settling operation.

Figure 7:
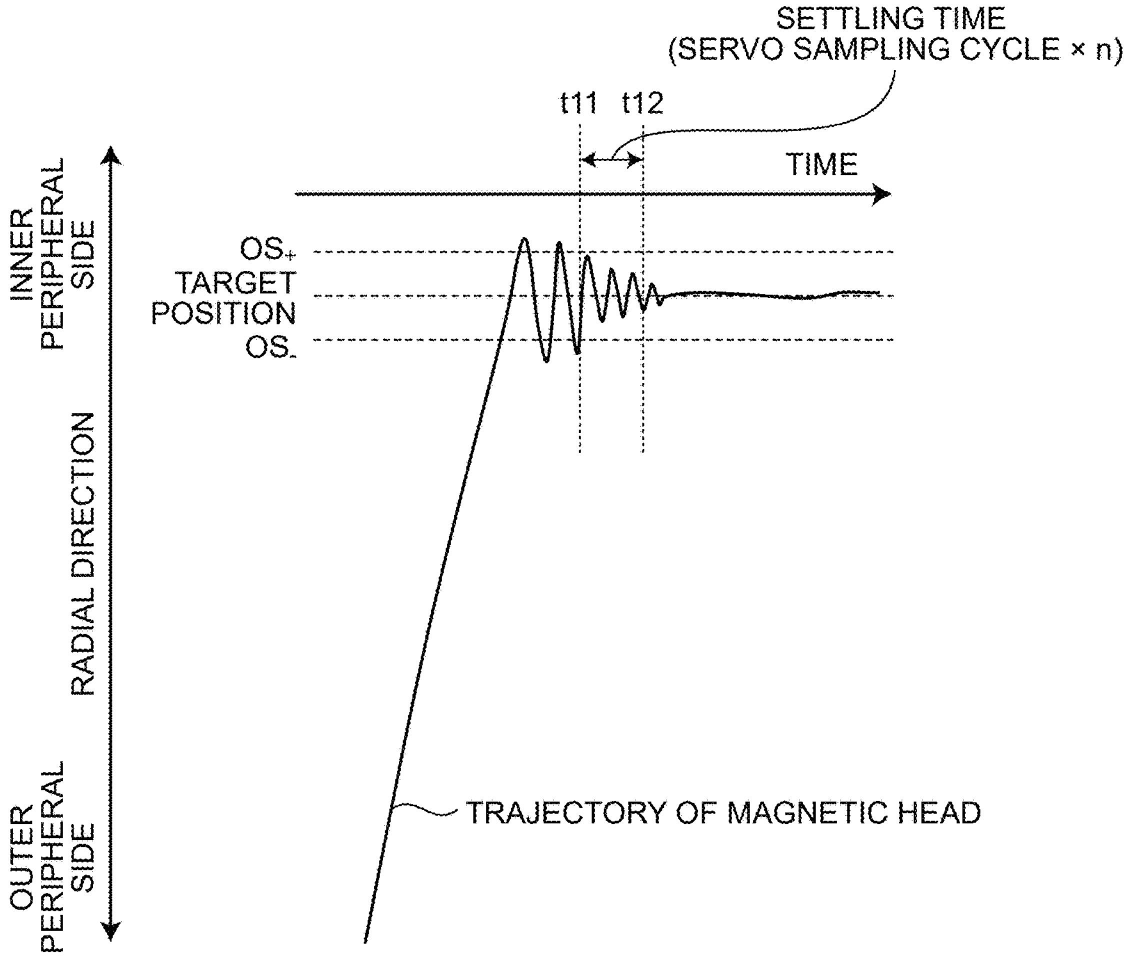
FIG. 7 is a view for describing a settling operation according to the embodiment.

FIG. 7 is a view for describing the settling operation according to the embodiment.

Even when the magnetic head H reaches a track center of the target data track, residual vibration of the magnetic head H occurs as illustrated in FIG. 7. If the residual vibration is large, a target data sector cannot be properly accessed. In the settling operation, determination as to whether the residual vibration has sufficiently attenuated is performed.

Specifically, the seek control unit 622 determines whether the radial position of the magnetic head His within a predetermined range including the track center of the target data track for a predetermined continuous period. The predetermined continuous period is referred to as a settling time. The predetermined range is referred to as a settling range.

In an example illustrated in FIG. 7, an on-track boundary $OS_+$ represents a boundary on the inner peripheral side of the settling range including the track center of the target data track. The on-track boundary $OS_+$ is set at a position offset from the track center of the target data track toward the inner peripheral side by a predetermined distance. An on-track boundary $OS_-$ represents a boundary on the outer peripheral side of the predetermined range including the track center of the target data track. The on-track boundary $OS_-$ is set at a position offset from the track center of the target data track toward the outer peripheral side by a predetermined distance. The settling time is defined as the servo sampling cycle×n (where n is a natural number).

In one example, the settling operation is started when the magnetic head H reaches the track center of the target data track. In the settling operation, when the magnetic head H enters the settling range from the outside of the settling range, the on-track determination unit 623 starts to count time (in other words, the servo sampling cycle). Even after the magnetic head H enters the settling range from the outside of the settling range, when the magnetic head H goes out of the settling range, the on-track determination unit 623 stops counting time and resets a count value. Then, when the magnetic head H enters the settling range from the outside of the settling range again, the on-track determination unit 623 starts to count time.

In a case where the count value does not reach the settling time, it can be estimated that the residual vibration has not sufficiently attenuated. Therefore, in this case, the on-track determination unit 623 continues the settling operation. In a case where the count value reaches the settling time, it can be estimated that the residual vibration has sufficiently attenuated. Therefore, in this case, the on-track determination unit 623 ends the settling operation and transmits the seek-on-track completion notification to the on-track determination unit 623.

As described above, upon confirming that the residual vibration has sufficiently attenuated, the on-track determination unit 623 determines that the magnetic head H is in an on-track state on the target data track.

Next, a head change will be described. The head change is an operation of causing the head amplifier IC to switch the magnetic head H in use among the magnetic heads H (i.e., the magnetic heads H1 to H4).

In a case of the example illustrated in FIG. 1, the magnetic disk device 1 includes two magnetic disks DK. The two magnetic disks DK have four recording surfaces, and these recording surfaces are accessed by mutually different magnetic heads H, respectively. In a case where recording surfaces to be accessed with two commands executed consecutively are different from each other, the head change is performed between two accesses according to the two commands. After completion of access corresponding to a command executed first out of the two commands, the seek control unit 622 performs a seek operation involving the head change in order to execute access corresponding to a command executed later out of the two commands.

As noted above, a subsequent disk shift may occur due to a temperature change or application of an impact after the manufacture of the magnetic disk device 1. There is a case where the seek operation involving the head change is adversely affected when orbits of the data tracks TRK of the different magnetic disks DK are eccentric relative to each other (hereinafter, relative eccentricity occurs) due to the subsequent disk shift.

The influence of the subsequent disk shift on the seek operation involving the head change will be described with reference to FIGS. 8 to 11. The seek operation involving the head change is referred to as a head change seek operation.

Figure 8:
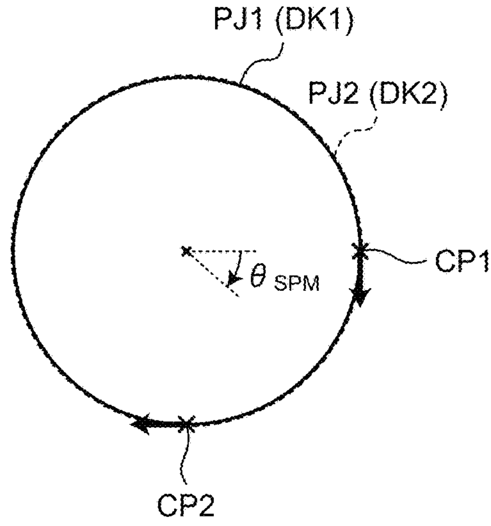
FIG. 8 is a view for describing a head change operation in a case where a subsequent disk shift does not occur.

FIG. 8 is a view for describing a head change operation in a case where the subsequent disk shift does not occur. In the following description, a motor angle of the SPM 13 is referred to as an SPM angle $\theta_{SPM}$. A circumferential position when the SPM angle $\theta_{SPM}$ is 0 radians is denoted by CP1, and a circumferential position when the SPM angle $\theta_{SPM}$ is $\pi/2$ radians is denoted by CP2.

For example, assume that the magnetic head H in use is switched from the magnetic head H (hereinafter, a current head $H_{from}$) facing a certain recording surface (hereinafter, a current recording surface) of the magnetic disk DK1 to the magnetic head H (hereinafter, a target head $H_{to}$) facing a certain recording surface (hereinafter, a target recording surface) of the magnetic disk DK2. An orbit of the data track TRK on which the current head $H_{from}$ is located on the current recording surface is denoted by PJ1. Here, for easy understanding, it is assumed that the magnetic head His kept on the orbit PJ1 with servo information recorded on the current recording surface as a reference before the head change.

Note that the current head $H_{from}$ is not necessarily kept on an orbit of a specific data track TRK before the head change. For example, the head change may be performed while the magnetic head His moving in the radial direction on the current recording surface.

When the subsequent disk shift does not occur, each of the data tracks TRK is corrected to the shape of the perfect circle about the shaft 12 by the virtual circle correction described above on each recording surface of the magnetic disk DK1 and each recording surface of the magnetic disk DK2.

Therefore, even if the head change is performed at any circumferential position on PJ1, the target head $H_{to}$ is located on an orbit PJ2 of a certain data track TRK on the target recording surface. This means that, in the head change, there is no difference between a velocity of the magnetic head H (more specifically, the current head $H_{from}$) in the radial direction observed with the servo information recorded on the current recording surface as a reference and a velocity of the magnetic head H (more specifically, the target head $H_{to}$) in the radial direction observed with servo information recorded on the target recording surface as a reference. The difference between the velocity of the magnetic head H in the radial direction observed with the servo information recorded on the current recording surface as a reference and the velocity of the magnetic head H in the radial direction observed with the servo information recorded on the target recording surface as a reference is referred to as a relative velocity of the magnetic head H.

Figure 9:
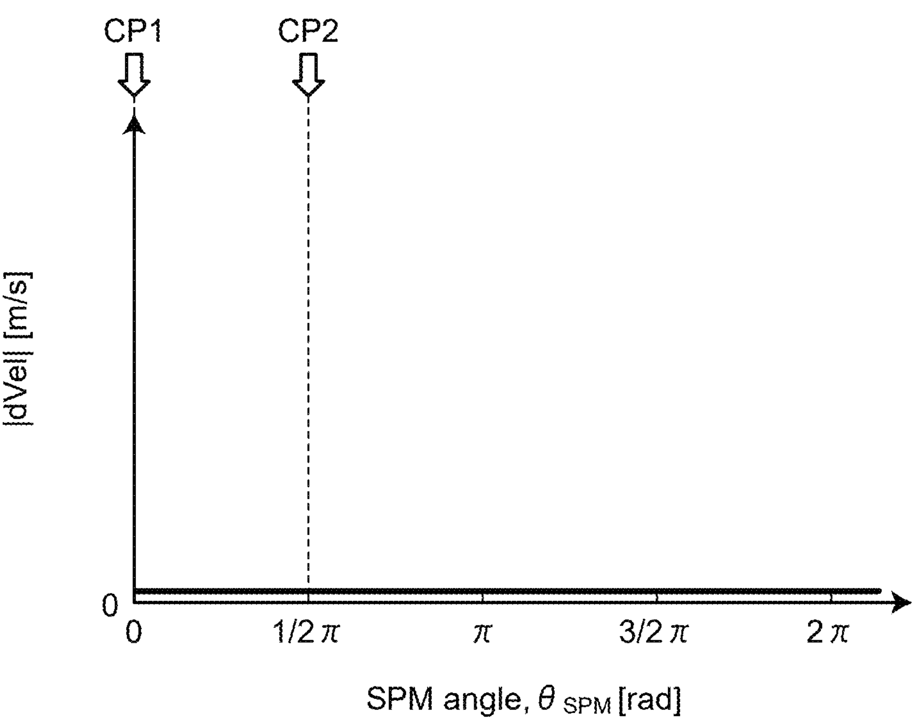
FIG. 9 is a view for describing a relative velocity of a magnetic head observed during the head change operation in the case where the subsequent disk shift does not occur.

FIG. 9 is a view for describing the relative velocity of the magnetic head H observed during the head change operation in the case where the subsequent disk shift does not occur. In the drawing, the relative velocity of the magnetic head His denoted by dVel. The vertical axis represents an absolute value of the relative velocity dVel of the magnetic head H. The horizontal axis represents the SPM angle $\theta_{SPM}$.

As illustrated in FIG. 9, the absolute value of the relative velocity dVel is zero even if the head change is performed at any circumferential position including the circumferential positions CP1 and CP2 illustrated in FIG. 8.

Figure 10:
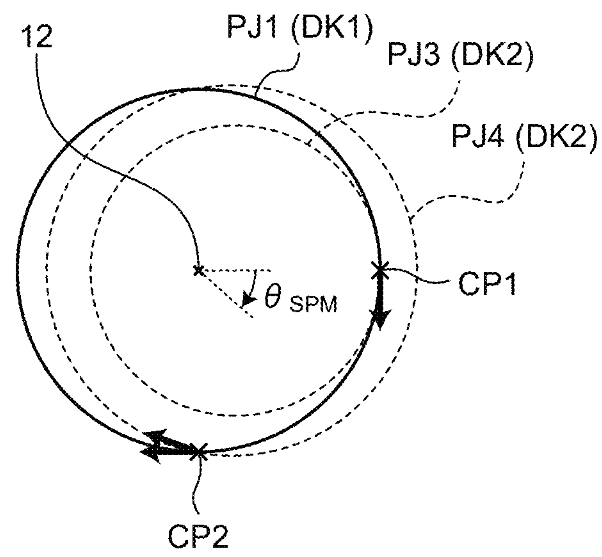
FIG. 10 is a view for describing the head change operation in a case where the subsequent disk shift occurs.

FIG. 10 is a view for describing the head change operation in a case where the subsequent disk shift occurs. In an example illustrated in the drawing, the magnetic disk DK2 is eccentric in a direction of $\theta_{SPM}=0$ radians due to the subsequent disk shift, and as a result, the relative eccentricity occurs between the magnetic disk DK1 and the magnetic disk DK2.

For example, when the head change is performed at the circumferential position CP1 on PJ1, the target head $H_{to}$ is on an orbit PJ3 of a certain data track TRK on the target recording surface immediately after the head change. When the head change is performed at the circumferential position CP2 on PJ1, the target head $H_{to}$ is on an orbit PJ4 different from the orbit PJ3 immediately after the head change. As described above, when the relative eccentricity occurs, a radial position detected based on the servo information differs between the two magnetic disks DK. Such deviation in the radial position, that is, a difference in the radial position detected based on the servo information recorded on each of the magnetic disks DK is referred to as a relative radial position.

The relative radial position changes sinusoidally with respect to the SPM angle $\theta_{SPM}$. Therefore, the relative velocity dVel of the magnetic head H in the radial direction also changes sinusoidally with respect to the SPM angle $\theta_{SPM}$.

Figure 11:
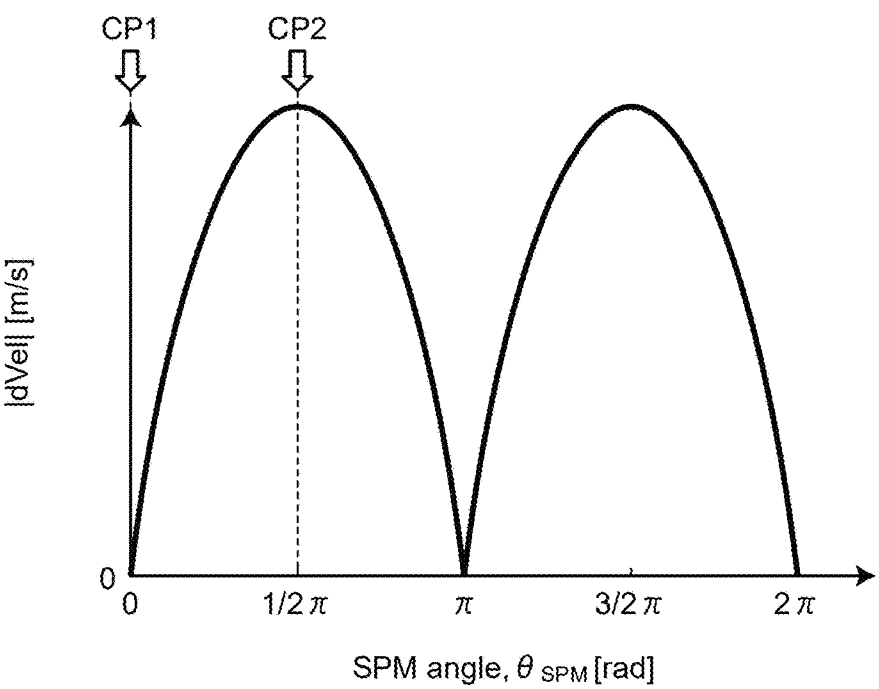
FIG. 11 is a view for describing the relative velocity of the magnetic head in a radial direction observed during the head change operation in the case where the subsequent disk shift occurs.

FIG. 11 is a view for describing the relative velocity of the magnetic head in the radial direction observed during the head change operation in the case where the subsequent disk shift occurs.

As illustrated in FIG. 11, the absolute value of the relative velocity dVel of the magnetic head H in the radial direction changes in a waveform obtained by folding back a sinusoidal waveform with respect to the SPM angle $\theta_{SPM}$.

The circumferential position CP1 corresponds to the circumferential position where the SPM angle $\theta_{SPM}$ is 0 radians. Then, the SPM angle $\theta_{SPM}$ of 0 radians coincides with the eccentric direction. Therefore, at the circumferential position CP1, a tangential direction of the orbit PJ1 and a tangential direction of the orbit PJ3 coincide with each other. Therefore, the absolute value of the relative velocity dVel at the circumferential position CP1 is zero.

The circumferential position CP2 is the circumferential position corresponding to the SPM angle $\theta_{SPM}$ different from the eccentric direction by $\pi/2$ radians. Therefore, at the circumferential position CP2, the absolute value of the relative velocity dVel is the maximum.

In general, when the absolute value of the relative velocity of the magnetic head is larger than 0 in the head change seek operation, the control of the seek operation immediately after the head change is more likely to be unstable as the absolute value of the relative velocity of the magnetic head is larger. Then, the more unstable the control of the seek operation is, the more greatly the magnetic head vibrates. This is remarkable when feedforward control is performed in the control of the seek operation.

If the magnetic head greatly vibrates immediately after the head change, the vibration affects the residual vibration at the time when the magnetic head reaches the target data track, and a time required for the settling operation also becomes long. In a case where the settling operation has not ended at the time when the magnetic head reaches the target data sector, so-called waiting for one rotation occurs in which waiting occurs until the magnetic disk makes one rotation and the magnetic head reaches the target data sector again. Thus, when the absolute value of the relative velocity of the magnetic head is larger than 0 in the head change seek operation, the time required for the seek operation becomes long, and the performance of the magnetic disk device viewed from the host system may deteriorate.

In the embodiment, the controller 10 adjusts a timing of performing the head change to make the magnitude of the vibration of the magnetic head H that may occur immediately after the head change smaller than an allowable level. This suppresses an increase in the time required for the seek operation involving the head change even if the subsequent disk shift occurs.

When the relative eccentricity occurs, the controller 10 calculates a temporal transition of the absolute value of the relative velocity dVel of the magnetic head H before the head change. In a case where the absolute value of the relative velocity dVel of the magnetic head His smaller than a threshold $Th_{dVel}$ corresponding to the allowable level of the magnitude of vibration of the magnetic head H that may occur immediately after the head change, the controller 10 executes the head change. In a case where the absolute value of the relative velocity dVel of the magnetic head His larger than the threshold $Th_{dVel}$, the controller 10 waits until the absolute value of the relative velocity dVel of the magnetic head H becomes smaller than the threshold $Th_{dVel}$, and executes the head change.

Figure 12:
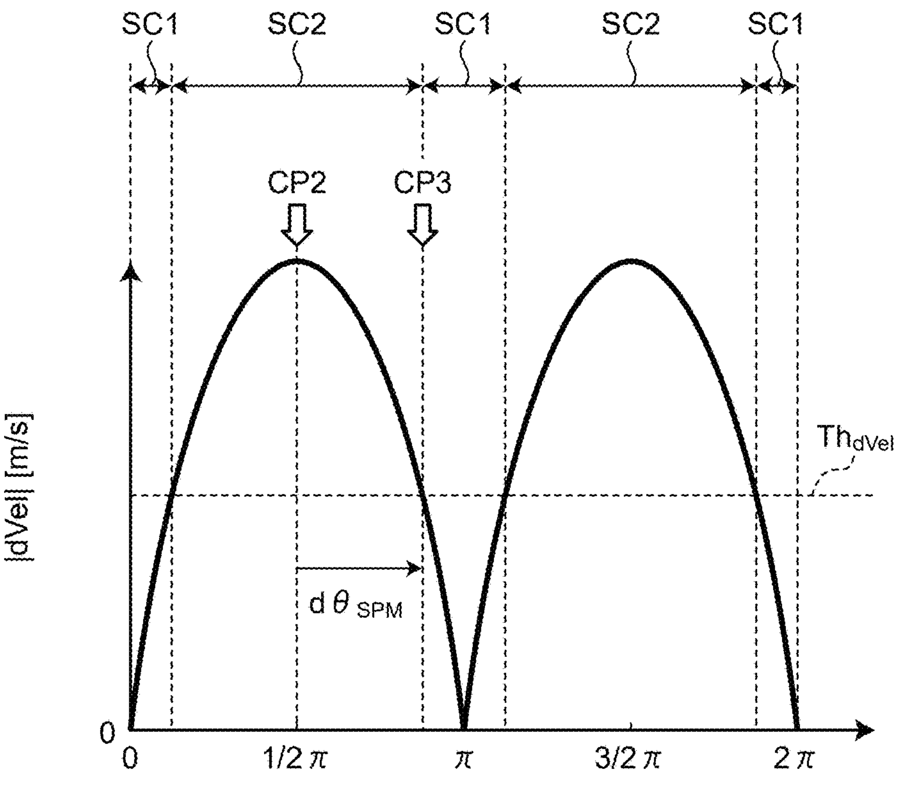
FIG. 12 is a view illustrating an example of a timing when a head change is possible according to the embodiment.

FIG. 12 is a view illustrating an example of a timing when the head change is possible according to the embodiment.

In the example illustrated in FIG. 12, in a section SC1, the head change is possible since the absolute value of the relative velocity dVel of the magnetic head His smaller than the threshold $Th_{dVel}$. In a section SC2, the head change is prohibited since the absolute value of the relative velocity dVel of the magnetic head H is larger than the threshold $Th_{dVel}$.

Therefore, for example, when the magnetic head H is located at a certain circumferential position CP2 in the section SC2, the controller 10 performs the head change after the magnetic head H reaches a circumferential position CP3 at a boundary between the section SC2 and the section SC1.

Figure 13:
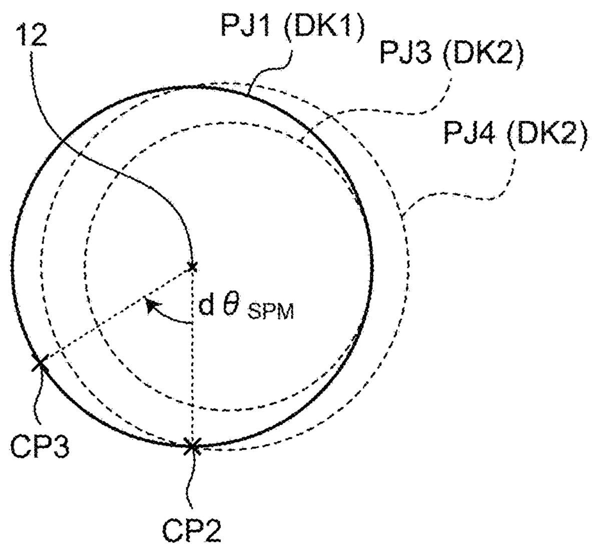
FIG. 13 is a view for describing a circumferential position where the head change is performed.

FIG. 13 is a view for describing the circumferential position CP3 that is a circumferential position where the head change is performed. As illustrated in the drawing, a circumferential position CP3 is a position on the orbit PJ1 when the SPM angle $\theta_{SPM}$ rotates by an angle $d\theta_{SPM}$ from the circumferential position CP2. The controller 10 waits until the magnetic head H reaches the circumferential position CP3 and performs the head change.

Next, operations of the magnetic disk device 1 according to the embodiment will be described.

As described above, when the orbit of the data track TRK is eccentric, the eccentricity estimation unit 624 estimates the degree of eccentricity.

Figure 14:
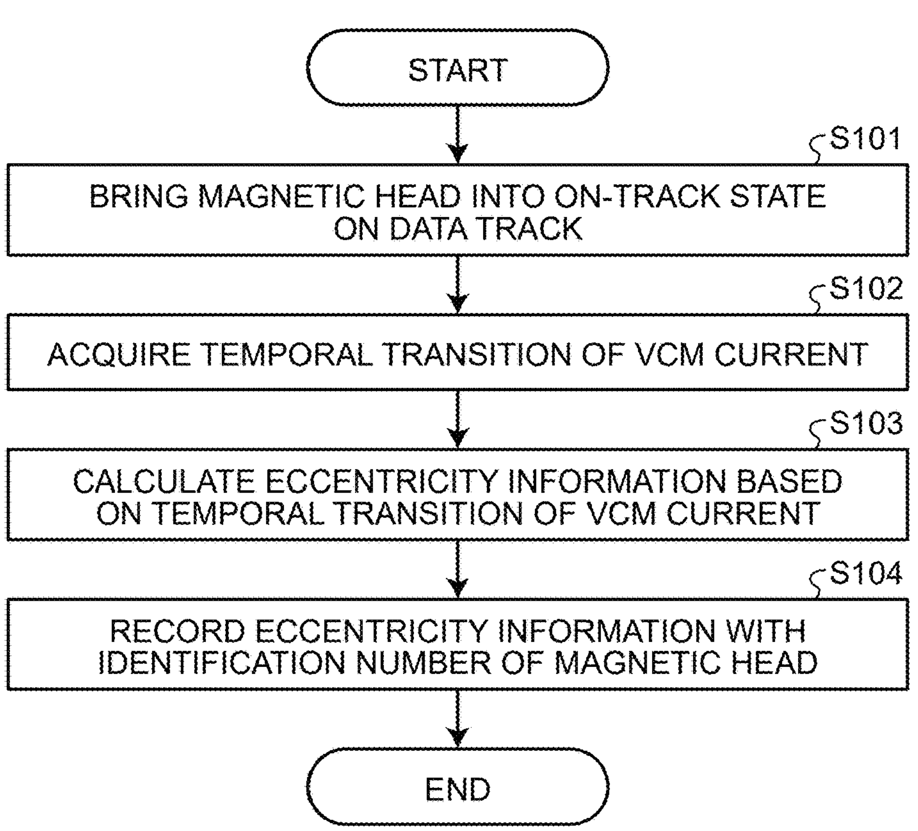
FIG. 14 is a flowchart illustrating an example of an operation of estimating the degree of eccentricity of an orbit of a data track according to the embodiment.

FIG. 14 is a flowchart illustrating an example of an operation of estimating the degree of eccentricity of the orbit of the data track TRK according to the embodiment. Here, an operation of estimating the eccentricity of the orbit of the data track TRK with respect to one recording surface of one magnetic disk DK will be described. Note that a series of operations illustrated in the drawing is executed for each recording surface. The series of operations illustrated in the drawing may be executed for one data track TRK per recording surface, or may be executed for two or more data tracks TRK per recording surface. In addition, a trigger for execution of the series of operations illustrated in the drawing is not limited to a specific event. For example, the series of operations illustrated in the drawing may be performed regularly. Alternatively, the series of operations illustrated in the drawing may be executed in response to a predetermined event (for example, detection of a temperature change equal to or more than a predetermined amount, detection of an impact on the magnetic disk device 1, or the like).

The eccentricity estimation unit 624 brings the magnetic head H into an on-track state on a certain data track TRK on a certain recording surface (S101).

The eccentricity estimation unit 624 acquires a temporal transition of a VCM current while performing tracking control to keep the magnetic head H on the data track TRK (S102).

A method for acquiring the temporal transition of the VCM current is not limited to a specific method. In one example, the eccentricity estimation unit 624 may measure the VCM current. In another example, the eccentricity estimation unit 624 may acquire the VCM current by current estimated by a state observer.

The eccentricity estimation unit 624 calculates eccentricity information, which is information indicating the degree of eccentricity, based on the temporal transition of the VCM current (S103).

When the eccentricity of the orbit of the data track TRK of the magnetic disk DK occurs due to the subsequent disk shift, a temporal transition of a radial position of the magnetic head H has a sinusoidal fluctuation component (hereinafter, a primary component) having one cycle per rotation of the magnetic disk DK. Then, an amplitude of the primary component corresponds to the amount of eccentricity, that is, a distance between a rotation center of the magnetic disk DK and the center of the data track TRK. In addition, a phase of the primary component corresponds to the eccentric direction. In S103, the eccentricity estimation unit 624 calculates the amplitude of the primary component and the phase of the primary component as the eccentricity information.

The eccentricity estimation unit 624 records the eccentricity information in association with an identification number of the magnetic head H (S104). Then, the operation of estimating the degree of eccentricity of the orbit of the data track TRK ends.

Note that a recording destination of the eccentricity information is not limited to a specific area as long as the eccentricity information is stored in a non-volatile storage area (for example, a predetermined area in the non-volatile memory 90 or the magnetic disk DK) before power is turned off.

Hereinafter, an example of a method for calculating the eccentricity information executed in S103 will be described.

The acceleration a of the magnetic head H in the radial direction is expressed by the following Formula (1) using the VCM current I, a known coefficient $k_{BL}$, and an equivalent mass m.

$$a = k_{BL} * I/m \tag{1}$$

As shown in the following Formula (2), by performing double integrals with respect to time t on the acceleration a of the magnetic head H in the radial direction, the acceleration a can be converted into numerical information (denoted as a position p) of a dimension of the radial position of the magnetic head H.

$$p = \int\int a(t)dtdt \tag{2}$$

When the eccentricity of the orbit of the data track TRK of the magnetic disk DK occurs due to the subsequent disk shift, each of the VCM current I, the acceleration a, and the position p has the primary component.

The eccentricity estimation unit 624 multiplies the VCM current I by a known conversion coefficient kip to acquire a temporal transition of the position p. The conversion coefficient kip is acquired in advance by calculation or measurement during the manufacture of the magnetic disk device 1 or the like, and is stored in a predetermined non-volatile storage area (for example, a predetermined area in the non-volatile memory 90 or the magnetic disk DK). The eccentricity estimation unit 624 reads the conversion coefficient kip from the non-volatile storage area and uses the conversion coefficient kip. The eccentricity estimation unit 624 acquires the eccentricity information from the temporal transition of the position p.

Note that, in the example illustrated in FIG. 14, the eccentricity estimation unit 624 acquires the eccentricity information based on the temporal transition of the VCM current I. A method for acquiring the eccentricity information is not limited thereto.

In one example, the eccentricity estimation unit 624 acquires a temporal transition of the acceleration a based on Formula (1). Then, the eccentricity estimation unit 624 multiplies the acceleration a by a known conversion coefficient $k_{ap}$ to acquire a temporal transition of the position p. The conversion coefficient $k_{ap}$ is acquired in advance by calculation or measurement during the manufacture of the magnetic disk device 1 or the like, and is stored in a predetermined non-volatile storage area (for example, a predetermined area in the non-volatile memory 90 or the magnetic disk DK). The eccentricity estimation unit 624 reads the conversion coefficient $k_{ap}$ from the non-volatile storage area and uses the conversion coefficient $k_{ap}$. The eccentricity estimation unit 624 acquires the eccentricity information from the temporal transition of the position p.

In another example, the eccentricity estimation unit 624 acquires the acceleration a by second-order differentiation of a demodulated position, and multiplies the acceleration a by the conversion coefficient $k_{ap}$ to acquire a temporal transition of the position p. The eccentricity estimation unit 624 acquires the eccentricity information from the temporal transition of the position p.

Note that the eccentricity estimation unit 624 may perform Fourier transform on the VCM current I, the acceleration a, or the position p obtained by any of the methods described above to acquire a primary component of the VCM current I, the acceleration a, or the position p, and use the primary component of the VCM current I, the acceleration a, or the position p for estimation of the eccentricity information.

FIG. 15 is a flowchart illustrating an example of an operation of executing a command according to the embodiment.

Upon receiving one or more commands from the host system 2 (S201), the command control unit 61 sequentially stores the received commands in the command queue 71.

The reordering control unit 612 acquires a seek-on-track time estimate (hereinafter, referred to as $T_{skontrk\_esti0}$) for each unexecuted command stored in the command queue 71 (S202).

In S202, the reordering control unit 612 calculates a seek distance for one command. Then, the reordering control unit 612 acquires the seek-on-track time estimate $T_{skontrk\_esti0}$ corresponding to the calculated value of the seek distance by referring to the seek-on-track time table 72. The reordering control unit 612 acquires the seek-on-track time estimate $I_{skontrk\_esti0}$ for each unexecuted command stored in the command queue 71.

The reordering control unit 612 calculates a pre-movement rotation waiting time (hereinafter, referred to as $T_{wait\_skst}$) for each unexecuted command stored in the command queue 71 (S203).

The pre-movement rotation waiting time $T_{wait\_skst}$ is a time from a timing when execution of a command being executed is completed until the absolute value of the relative velocity dVel of the magnetic head H becomes smaller than the threshold $T_{dVel}$ in a case where the head change seek operation is required.

In a case where the head change seek operation is required for executing one command, the reordering control unit 612 calculates a relative radial position between a current recording surface and a target recording surface for at least one rotation of the SPM 13 based on eccentricity information about the current recording surface and eccentricity information about the target recording surface. The reordering control unit 612 time-differentiates the relative radial position to acquire the relative velocity dVel of the magnetic head H for at least one rotation of the SPM 13. The reordering control unit 612 acquires an SPM angle $\theta_{SPM\_C}$ at the timing when the execution of the command being executed is completed.

When the relative velocity dVel of the magnetic head H at the SPM angle $\theta_{SPM\_C}$ is larger than the threshold $Th_{dVel}$, the reordering control unit 612 calculates the angle $d\theta_{SPM}$ of rotation required until the absolute value |dVel| of the relative velocity dVel of the magnetic head H becomes smaller than the threshold $T_{dVel}$. The reordering control unit 612 calculates a time required for the SPM 13 to rotate by the angle $d\theta_{SPM}$ from a rotation speed of the SPM 13 and the angle $d\theta_{SPM}$. Then, the reordering control unit 612 sets the time obtained by the calculation as the pre-movement rotation waiting time $T_{wait\_skst}$.

When the relative velocity dVel of the magnetic head H at the SPM angle $\theta_{SPM\_C}$ is not larger than the threshold $Th_{dVel}$, the reordering control unit 612 sets the pre-movement rotation waiting time $T_{wait\_skst}$ to 0.

The reordering control unit 612 calculates the pre-movement rotation waiting time $T_{wait\_skst}$ for each unexecuted command stored in the command queue 71. However, the reordering control unit 612 sets the pre-movement rotation waiting time $T_{wait\_skst}$ to 0 for a command that does not require the head change seek operation for execution.

Subsequent to S203, the reordering control unit 612 calculates a reordering cost (hereinafter, referred to as $T_{skontrk\_esti}$) for each unexecuted command stored in the command queue 71 (S204).

For the command that does not require the head change seek operation for execution, the reordering control unit 612 calculates the reordering cost $T_{skontrk\_esti}$ using the following Formula (3).

$$T_{skontrk\_esti} = T_{skontrk\_esti0} \tag{3}$$

For a command that requires the head change seek operation for execution, the reordering control unit 612 calculates the reordering cost $T_{skontrk\_esti}$ using the following Formula (4).

$$T_{skontrk\_esti} = T_{skontrk\_esti0} + T_{chg\_head\_base} + T_{wait\_skst} \tag{4}$$

Note that, in Formula (4), $I_{chg\_head\_base}$ is a time required for the head change regardless of whether the relative eccentricity occurs.

Subsequent to S204, the reordering control unit 612 determines a command to be executed next (referred to as a target command) based on the reordering cost $I_{skontrk\_esti}$ obtained for each unexecuted command stored in the command queue 71 (S205). For example, in a case where one or more unexecuted commands are stored in the command queue 71, the reordering control unit 612 determines, as the target command, a command with the minimum reordering cost $T_{skontrk\_esti}$ among the one or more unexecuted commands.

The command control unit 61 notifies the servo control unit 62 of a seek request for executing the target command and the pre-movement rotation waiting time $T_{wait\_skst}$ calculated for the target command (S206).

When the servo control unit 62 receives the seek request and the pre-movement rotation waiting time $T_{wait\_skst}$ (S301), the seek control unit 622 performs rotation waiting for the pre-movement rotation waiting time $T_{wait\_skst}$ (S302), and performs a head change after completion of the rotation waiting (S303). Note that, when the target command corresponds to the command that does not require the head change seek operation for execution, in other words, when the current head $H_{from}$ is equal to the target head $H_{to}$, the processing of S303 is skipped.

The seek control unit 622 moves the magnetic head H toward a target data track (S304). When the magnetic head H reaches the target data track, the on-track determination unit 623 performs the settling operation. In the settling operation, when the on-track determination unit 623 determines that the magnetic head His in an on-track state on the target data track (S305), the on-track determination unit 623 notifies the command control unit 61 of the seek-on-track completion notification (S306).

When the command control unit 61 receives the seek-on-track completion notification (S307), the command control unit 61 performs rotation waiting until the magnetic head H reaches a target data sector (S308). When the magnetic head H reaches the target data sector, the command control unit 61 controls access to the target data sector (S309). Then, a series of operations is completed.

Note that, in the example illustrated in FIG. 15, it has been described that the processing of S201 and the processing of S202 to S209 are executed in this order for the sake of convenience. In practice, the processing of S201 and the processing of S202 to S209 are executed asynchronously with each other. Every time a command is received from the host system 2, the command control unit 61 stores the received command in the command queue 71. Then, as long as there are one or more unexecuted commands in the command queue 71, the command control unit 61 and the servo control unit 62 repeatedly execute the processing of S202 to S209.

According to the configuration described above, the magnetic disk device 1 according to the embodiment performs a characteristic operation to be described next.

Figure 16:
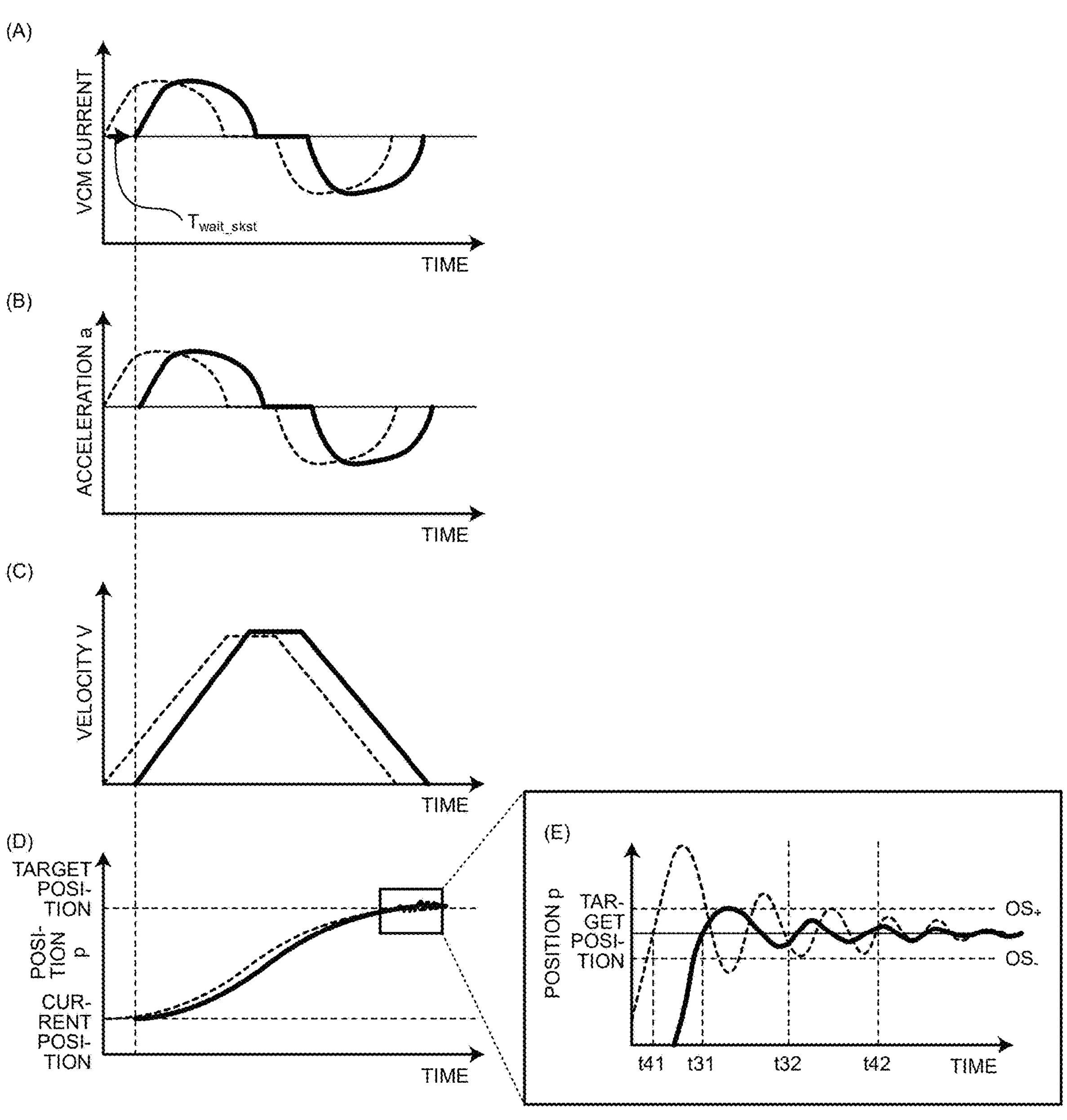
FIG. 16 is a view illustrating an example of a characteristic operation executed by a magnetic disk device according to the embodiment.

FIG. 16 is a view illustrating an example of the characteristic operation executed by the magnetic disk device 1 according to the embodiment. The drawing is a view for describing an operation of moving the magnetic head H (more specifically, the target head $H_{to}$) in a case where the pre-movement rotation waiting time $T_{wait\_skst}$ obtained by calculation is non-zero. Note that the case where the pre-movement rotation waiting time $T_{wait\_skst}$ is non-zero is, for example, a case where the SPM angle $\theta_{SPM}$ is within the section SC2 according to the description illustrated in FIG. 12.

In FIG. 16, part (A) is a graph illustrating a waveform of the VCM current I (that is, the current supplied to the VCM 17) during the seek operation. Part (B) is a graph illustrating a waveform of the acceleration a of the magnetic head H during the seek operation. Part (C) is a graph illustrating a waveform of the velocity v of the magnetic head H during the seek operation. Part (D) is a graph illustrating a transition of the radial position of the magnetic head H during the seek operation. Part (E) is a graph illustrating a timing when the seek-on-track completion notification is issued. In the graphs of parts (A) to (D), the horizontal axis represents time with a start timing of the seek operation as time 0.

In the graph illustrated in each part, a waveform indicated by a solid line indicates a waveform observed in the magnetic disk device 1 according to the embodiment.

According to the waveforms of the solid lines illustrated in parts (A) to (D), the head change and the start of the movement of the magnetic head H are performed after the pre-movement rotation waiting time $T_{wait\_skst}$ elapses from the timing when the seek operation is started. Then, according to part (E), the magnetic head H reaches the target position, that is, the track center of the target data track TRK at time t31. Then, through the settling operation, the seek-on-track completion notification is issued at time t32.

Here, a technique to be compared with the embodiment will be described. The technique to be compared with the embodiment will be denoted as a comparative example. According to the comparative example, a controller performs a head change and a start of movement of a magnetic head. In the graph illustrated in each part, a waveform indicated by a dotted line indicates a waveform observed in a magnetic disk device to which the comparative example is applied.

According to the comparative example, as can be seen from the waveforms of the dotted lines illustrated in parts (A) to (D), even if an SPM angle is within the section SC2, the head change and the start of the movement of the magnetic head are performed at a timing when a seek operation is started. Since the start timing of the movement of the magnetic head is earlier than that in the example of the embodiment, the magnetic head reaches a target position, that is, a track center of a target data track at time t41 earlier than the time t31. However, since the magnitude of residual vibration after the magnetic head reaches the track center of the target data track is larger than the magnitude of the residual vibration in the case of the embodiment, a settling operation takes a significantly longer time as compared with the embodiment. As a result, a seek-on-track completion notification is issued at time t42 later than the time t32.

According to the embodiment, when the subsequent disk shift occurs, vibration that may occur at the time of the head change can be suppressed, and as a result, the increase in the time required for the seek operation can be suppressed.

Note that, in the description of the embodiment, the SPM 13 is an example of a first motor that integrally rotates the magnetic disks DK. The VCM 17 is an example of a second motor capable of integrally moving the magnetic heads H in the radial direction of the magnetic disks DK. The processing of S302 illustrated in FIG. 15 is an example of a waiting operation.

As described above, according to the embodiment, the controller 10 executes the head change seek operation when executing a command (referred to as a first command) for accessing a certain recording surface (referred to as a first recording surface) among the recording surfaces and a command (referred to as a second command) for accessing another recording surface (referred to as a second recording surface) different from the first recording surface among the recording surfaces in this order. In other words, the controller 10 executes the first command, executes the head change seek operation for executing the second command subsequent to completion of the access according to the first command, and executes the second command subsequent to completion of the head change seek operation. In the head change seek operation, after the completion of the access according to the first command, the controller 10 performs the waiting operation according to the relative velocity in the radial direction between the magnetic head H (referred to as a first magnetic head) facing the first recording surface and the magnetic head H (referred to as a second magnetic head) facing the second recording surface. Then, subsequent to the waiting operation, the controller 10 executes the head change of switching the magnetic head H in use from the first magnetic head to the second magnetic head, and the start of movement of the magnetic heads H using the VCM 17.

Therefore, when the subsequent disk shift occurs, the vibration that may occur at the time of the head change can be suppressed, and as a result, the increase in the time required for the seek operation can be suppressed. Therefore, the magnetic disk device 1 can execute suitable control even when the subsequent disk shift occurs.

In addition, according to the embodiment, when the absolute value of the relative velocity between the first magnetic head and the second magnetic head is larger than the threshold $Th_{dVel}$, the controller 10 performs the waiting operation. When the absolute value of the relative velocity between the first magnetic head and the second magnetic head is smaller than the threshold $Th_{dVel}$, the controller 10 does not perform the waiting operation.

Therefore, when the subsequent disk shift occurs, the vibration that may occur at the time of the head change can be suppressed, and as a result, the increase in the time required for the seek operation can be suppressed.

In addition, according to the embodiment, in the waiting operation, the controller 10 waits until the absolute value of the relative velocity between the first magnetic head and the second magnetic head becomes smaller than the threshold $Th_{dVel}$.

Therefore, when the subsequent disk shift occurs, the vibration that may occur at the time of the head change can be suppressed, and as a result, the increase in the time required for the seek operation can be suppressed.

Note that, according to the embodiment, the controller 10 calculates the relative velocity between the first magnetic head and the second magnetic head based on the relative radial position between the data track TRK provided on the first recording surface and the data track TRK provided on the second recording surface, for example, as described in S203 of FIG. 15.

More specifically, as described in FIG. 14, the controller 10 estimates the amount of eccentricity and the eccentric direction for each of the data track TRK provided on the first recording surface and the data track TRK provided on the second recording surface. Then, the controller 10 calculates the relative eccentric position based on the amount of eccentricity and the eccentric direction of the data track TRK provided on the first recording surface and the amount of eccentricity and the eccentric direction of the data track TRK provided on the second recording surface.

The controller 10 estimates the amount of eccentricity and the eccentric direction applied to each of the data tracks TRK based on any one of the VCM current I, the accelerations a of the magnetic heads H, or the positions p of the magnetic heads H.

For example, the controller 10 may acquire the position p of the magnetic head H based on the VCM current I and the conversion coefficient kip, and estimate the amount of eccentricity and the eccentric direction based on the position p.

Alternatively, the controller 10 may acquire the position p of the magnetic head H based on the acceleration a of the magnetic head H and the conversion coefficient $k_{ap}$, and estimate the amount of eccentricity and the eccentric direction based on the position p.

In addition, according to the embodiment, for example, as illustrated in FIGS. 5 and S202 to S205 in FIG. 15, the controller 10 calculates the time required for the waiting operation, that is, the pre-movement rotation waiting time $T_{wait\_skst}$, for each of one or more unexecuted commands stored in the command queue 71. Then, the controller 10 determines the execution order of the one or more unexecuted commands based on the pre-movement rotation waiting times $T_{wait\_skst}$.

The controller 10 determines the execution order of commands in consideration of the influence of the vibration that may occur due to the head change. This makes it possible to prevent occurrence of unintended waiting for one rotation. Thus, the efficiency of execution of the one or more unexecuted commands is improved.

Modification Example

In the above-described embodiment, the threshold $Th_{dVel}$ is a fixed value. The threshold $Th_{dVel}$ is not necessarily a fixed value.

Even if vibration of the magnetic head H occurs due to a head change, the vibration of the magnetic head H attenuates with a lapse of time. On the other hand, a time from a start of movement of the magnetic head H to a start of a settling operation is longer as a seek distance is longer. Therefore, the influence of the vibration of the magnetic head H caused by the head change on the settling operation decreases as the seek distance is longer.

Figure 17:
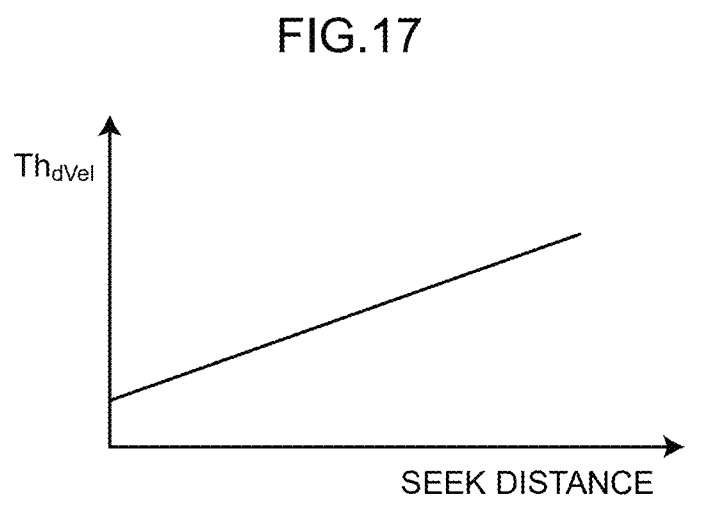

Therefore, as illustrated in FIG. 17, for example, the threshold $Th_{dVel}$ is made smaller as the seek distance is longer. In the processing of S203 of FIG. 15, the controller 10 acquires the threshold $Th_{dVel}$ corresponding to the seek distance for each unexecuted command based on a preset relationship illustrated in FIG. 17. Then, the controller 10 calculates the pre-movement rotation waiting time $T_{wait\_skst}$ for each unexecuted command using the threshold $Th_{dVel}$ that is different in value for each unexecuted command.

Note that the threshold $Th_{dVel}$ may be determined based on any information instead of the seek distance or in addition to the seek distance. For example, the controller 10 can calculate the threshold $Th_{dVel}$ based on one or more of the seek distance, a combination of positions of the magnetic heads H at a start and an end of a seek operation, a combination of the magnetic heads H before and after switching of the magnetic head H in use, a temperature of the magnetic disk device 1, or a temperature of the VCM 17.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

two or more magnetic disks including two or more recording surfaces;

a first motor configured to integrally rotate the two or more magnetic disks;

a group of magnetic heads facing mutually different recording surfaces among the two or more recording surfaces;

a second motor configured to integrally move the group of magnetic heads in a radial direction of the two or more magnetic disks; and a controller configured to execute a first command, the first command being a command for accessing a first recording surface among the two or more recording surfaces, execute a seek operation for executing a second command subsequent to completion of access according to the first command, the second command being a command for accessing a second recording surface different from the first recording surface among the two or more recording surfaces, and execute the second command subsequent to completion of the seek operation, wherein the seek operation includes performing a waiting operation in accordance with a relative velocity in the radial direction between a first magnetic head and a second magnetic head after the completion of the access according to the first command, the first magnetic head being a magnetic head facing the first recording surface in the group of magnetic heads, the second magnetic head being a magnetic head facing the second recording surface in the group of magnetic heads, and executing, subsequent to the waiting operation, switching of a magnetic head in use from the first magnetic head to the second magnetic head and starting of movement of the group of magnetic heads using the second motor.

2. The magnetic disk device according to claim 1, wherein the controller is configured to perform the waiting operation when an absolute value of the relative velocity is larger than a threshold, and perform none of the waiting operation when the absolute value of the relative velocity is smaller than the threshold.

3. The magnetic disk device according to claim 2, wherein the waiting operation is an operation of waiting until the absolute value of the relative velocity becomes smaller than the threshold.

4. The magnetic disk device according to claim 2, wherein the controller is configured to calculate the threshold based on one or more of a seek distance, a combination of positions of the group of magnetic heads at a start and an end of the seek operation, a combination of the magnetic heads before and after the switching of the magnetic head in use, a temperature of the magnetic disk device, or a temperature of the second motor.

5. The magnetic disk device according to claim 1, wherein the two or more recording surfaces are each provided with tracks, and the controller is configured to calculate the relative velocity based on a relative position between a first track on the first recording surface and a second track on the second recording surface.

6. The magnetic disk device according to claim 5, wherein the controller is configured to estimate an amount of eccentricity and an eccentric direction for each of the first track and the second track, and calculate the relative position based on the amount of eccentricity and the eccentric direction of the first track and the amount of eccentricity and the eccentric direction of the second track.

7. The magnetic disk device according to claim 6, wherein the controller is configured to estimate the amount of eccentricity and the eccentric direction for each of the first track and the second track based on an amount of current supplied to the second motor, accelerations of the group of magnetic heads, or positions of the group of magnetic heads.

8. The magnetic disk device according to claim 6, wherein the controller is configured to acquire, for each of the first track and the second track, information about an amount of current supplied to the second motor, acquire information about positions of the group of magnetic heads based on the information about the amount of current supplied to the second motor and a coefficient, and estimate the amount of eccentricity and the eccentric direction based on the positions of the group of magnetic heads.

9. The magnetic disk device according to claim 6, wherein the controller is configured to acquire, for each of the first track and the second track, information about accelerations of the group of magnetic heads, acquire information about positions of the group of magnetic heads based on the information about the accelerations of the group of magnetic heads and a coefficient, and estimate the amount of eccentricity and the eccentric direction based on the information about the positions of the group of magnetic heads.

10. The magnetic disk device according to claim 1, further comprising a memory provided with a command queue in which one or more unexecuted commands are stored, wherein the controller is configured to calculate a time required for the waiting operation for each of the one or more unexecuted commands stored in the command queue, and determine an execution order of the one or more unexecuted commands based on a calculated value of the time required for the waiting operation.

11. A method of controlling a magnetic disk device, the magnetic disk device including two or more magnetic disks, a group of magnetic heads, and a motor, the two or more magnetic disks including two or more recording surfaces and being integrally rotated, the group of magnetic heads facing mutually different recording surfaces among the two or more recording surfaces, the motor integrally moving the group of magnetic heads in a radial direction of the two or more magnetic disks, the method comprising:

executing a first command, the first command being a command for accessing a first recording surface among the two or more recording surfaces;

executing a seek operation for executing a second command subsequent to completion of access according to the first command, the second command being a command for accessing a second recording surface different from the first recording surface among the two or more recording surfaces; and executing the second command subsequent to completion of the seek operation, wherein the seek operation includes performing a waiting operation in accordance with a relative velocity in the radial direction between a first magnetic head and a second magnetic head after the completion of the access according to the first command, the first magnetic head being a magnetic head facing the first recording surface in the group of magnetic heads, the second magnetic head being a magnetic head facing the second recording surface in the group of magnetic heads, and executing, subsequent to the waiting operation, switching of a magnetic head in use from the first magnetic head to the second magnetic head and starting of movement of the group of magnetic heads using the motor.

12. The method according to claim 11, wherein the waiting operation is performed in response to an absolute value of the relative velocity becoming larger than a threshold.

13. The method according to claim 12, wherein the waiting operation is an operation of waiting until the absolute value of the relative velocity becomes smaller than the threshold.

14. The method according to claim 12, further comprising calculating the threshold based on one or more of a seek distance, a combination of positions of the group of magnetic heads at a start and an end of the seek operation, a combination of the magnetic heads before and after the switching of the magnetic head in use, a temperature of the magnetic disk device, or a temperature of the motor.

15. The method according to claim 11, wherein the two or more recording surfaces are each provided with tracks, and the method further comprises calculating the relative velocity based on a relative position between a first track on the first recording surface and a second track on the second recording surface.

16. The method according to claim 15, wherein the calculating the relative velocity includes estimating an amount of eccentricity and an eccentric direction for each of the first track and the second track, and calculating the relative position based on the amount of eccentricity and the eccentric direction of the first track and the amount of eccentricity and the eccentric direction of the second track.

17. The method according to claim 16, wherein the estimating the amount of eccentricity and the eccentric direction is performed by estimating the amount of eccentricity and the eccentric direction for each of the first track and the second track based on an amount of current supplied to the motor, accelerations of the group of magnetic heads, or positions of the group of magnetic heads.

18. The method according to claim 16, wherein the estimating the amount of eccentricity and the eccentric direction includes acquiring, for each of the first track and the second track, information about an amount of current supplied to the motor, acquiring information about positions of the group of magnetic heads based on the information about the amount of current supplied to the motor and a coefficient, and estimating the amount of eccentricity and the eccentric direction based on the positions of the group of magnetic heads.

19. The method according to claim 16, wherein the estimating the amount of eccentricity and the eccentric direction includes acquiring, for each of the first track and the second track, information about accelerations of the group of magnetic heads, acquiring information about positions of the group of magnetic heads based on the information about the accelerations of the group of magnetic heads and a coefficient, and estimating the amount of eccentricity and the eccentric direction based on the information about the positions of the group of magnetic heads.

20. The method according to claim 11, wherein the magnetic disk device further includes a memory provided with a command queue in which one or more unexecuted commands are stored, the method further comprises:

calculating a time required for the waiting operation for each of the one or more unexecuted commands stored in the command queue, and determining an execution order of the one or more unexecuted commands based on a calculated value of the time required for the waiting operation.

* * * * *